United States Patent [19]

Suzuki et al.

[11] Patent Number: 4,532,173

[45] Date of Patent: Jul. 30, 1985

[54] FIBRE-IMPLANTED NONWOVEN FABRIC

[75] Inventors: Migaku Suzuki; Toshio Kobayashi; Satoshi Sasaki; Shigeo Imai, all of Ehime, Japan

[73] Assignee: Uni-Charm Corporation, Ehime, Japan

[21] Appl. No.: 460,908

[22] Filed: Jan. 25, 1983

[30] Foreign Application Priority Data

Jan. 31, 1982 [JP] Japan ................................. 57-13531

[51] Int. Cl.³ .............................................. B32B 7/02
[52] U.S. Cl. .................................... 428/218; 428/219; 428/284; 428/297; 428/423.1; 428/304.4
[58] Field of Search ............... 428/218, 219, 284, 295, 428/297, 232, 304.4, 317.9, 311.1, 311.5, 311.7, 311.9, 423.1, 446, 903, 904; 28/104, 105

[56] References Cited

U.S. PATENT DOCUMENTS

| 4,016,319 | 4/1977 | Marshall | 428/218 |
| 4,172,172 | 10/1979 | Suzuki et al. | 428/224 |
| 4,190,695 | 2/1980 | Nederhauser | 28/104 |
| 4,461,099 | 6/1984 | Bailly | 428/300 |
| 4,464,428 | 8/1984 | Ebert et al. | 428/95 |
| 4,469,740 | 9/1984 | Bailly | 428/300 |

FOREIGN PATENT DOCUMENTS 2085493 4/1982 United Kingdom .

Primary Examiner—James J. Bell
Attorney, Agent, or Firm—Fred Philpitt

[57] ABSTRACT

Here are disclosed a nonwoven fabric comprising short fibres implanted from the surface(s) of a stretchably elastic foamed sheet deeply into the interior thereof wherein said short fibres are not only mutually entangled on said surface but also being interlocked with material of said foamed sheet on said surface as well as in the interior thereof; and a method for production of such nonwoven fabric by accomplishing implantation of said short fibres into said foamed sheet under high energy treatment with high velocity water streams (FIG. 4).

7 Claims, 10 Drawing Figures

FIBRE-IMPLANTED NONWOVEN FABRIC

BACKGROUND OF THE INVENTION

The present invention relates to fibre-implanted nonwoven fabric comprising a combination of short fibres and a stretchy and elastic foamed sheet, and particularly to fibre-implanted nonwoven fabric in which these short fibres are not only mutually entangled on at least one surface of the foamed sheet but also interlocked with material of the foamed sheet along the surface and in the interior of said foamed sheet. The present invention relates also to a method for production of such fibre-implanted nonwoven fabric.

Single component nonwoven fabric made of fibrous web is so poor in its elasticity and stretchiness that such single component nonwoven fabric is not suitable at all as material for the product adapted, in use, to be pressed against or held to skin of human body. On the other hand, a stretchy and elastic foamed sheet, although preferred in said properties, is also unsuitable as material for the product to be used in direct contact with skin of human body, because such sheet has no comfortable fabric touch.

It is well known to implant extremely short fibres on a surface of a foamed sheet by so-called electrostatic implantation method or to laminate a fibrous layer comprising, for example, a fibrous web or cloth integrally to the surface of such foamed sheet with interposition of adhesive or directly by fusion so that the surface of this sheet may be bestowed with the fabric touch. However, the sheets thus obtained by the conventional methods have always been disadvantageous in that the layer of the foamed sheet itself and the fibrous layer have their characteristics too clearly distinguished from each other, since the fibres are merely laminated on the foamed sheet and that the initial elasticity of the foamed sheet itself is substantially maintained in the direction of the thickness thereof but can not be free from a serious deterioration in the superficial direction, since the fibrous layer is fixed thereto by adhesive or fusion. In consequence, no multiplicative effect is obtained from a combination of these two components in the sheet of prior art and such sheet is not suitable as material for the products as previously mentioned. Use of the sheet of prior art is, therefore, strictly limited. Particularly, the sheet of prior art utilizing adhesive is unsuitable as material for the products adapted to be used in direct contact with skin of human body from a medical viewpoint.

To obtain a novel product of this type which should be able to overcome the above-mentioned drawbacks, the inventors conducted various studies and found that the desired product is obtained when short fibres are implanted on an elastic foamed sheet by high energy treatment with water jet streams without use of any particular substance such as adhesive or binder or particular means such as fusion. The present invention is based on this observation.

According to the present invention, as has been described hereinabove, the short fibres of desired length and basic weight are implanted, without any particular adhesive or binder, on the stretchy and elastic foamed sheet from the surface into the interior thereof to provide nonwoven fabric in which said short fibres are not only mutually entangled on said surface but also interlocked with material of the foamed sheet at the level of said surface as well as in the interior of said foamed sheet in a complicated manner, so that said nonwoven fabric has a stretching elasticity substantially corresponding to that which is intrinsic to said foamed sheet and presents fabric appearance as well as touch on its surface. Furthermore, the nonwoven fabric according to the present invention is practically free from the inconvenience that said short fibres might easily fall off said foamed sheet. Accordingly, the nonwoven fabric according to the present invention can be advantageously used in practice as material for the products adapted to be, in their use, resiliently pressed against skin of human body. The method according to the present invention permits repeated use of the water jet streams for efficient treatment of the initial material to be treated and, in consequence, permits the nonwoven fabric of excellent properties as described above to be mass-produced at a reasonable low cost.

SUMMARY OF THE INVENTION

The present invention is to provide the fibre-implanted nonwoven fabric as above mentioned and the method for production of such fibre-implanted nonwoven fabric comprising steps of laying fibrous web of a basic weight between 5 and 80 g/cm$^2$ and consisting of fibres shorter than 100 mm upon a foamed sheet of open pore type having a thickness less than 5 mm to prepare an initial material to be treated, introducing this initial material to be treated onto water impermeable supports each having a smooth and adequately hard surface, and supplying columnar water jet streams at a pressure higher than 15 kg/cm$^2$ from a plurality of orifices arranged above the respective supports at intervals transversely of said initial material to be treated against the assembly of the fibrous web and the foamed sheet, said foamed sheet being stretched by 10% or more, from the side of said fibrous web so that the short fibres of said fibrous web may be implanted as deeply as into the interior of said foamed sheet in a striped pattern defined by alternately arranged zones of high density and low density and not only mutually entangled on the surface of said fibrous web but also interlocked with material of said foamed sheet along the surface as well as in the interior thereof.

BRIEF DESCRIPTION OF THE DRAWING

Preferred embodiments of the present invention will be now described in reference with the accompanying drawing in which.

DESCRIPTION OF PREFERRED EMBODIMENTS

Figure 1:
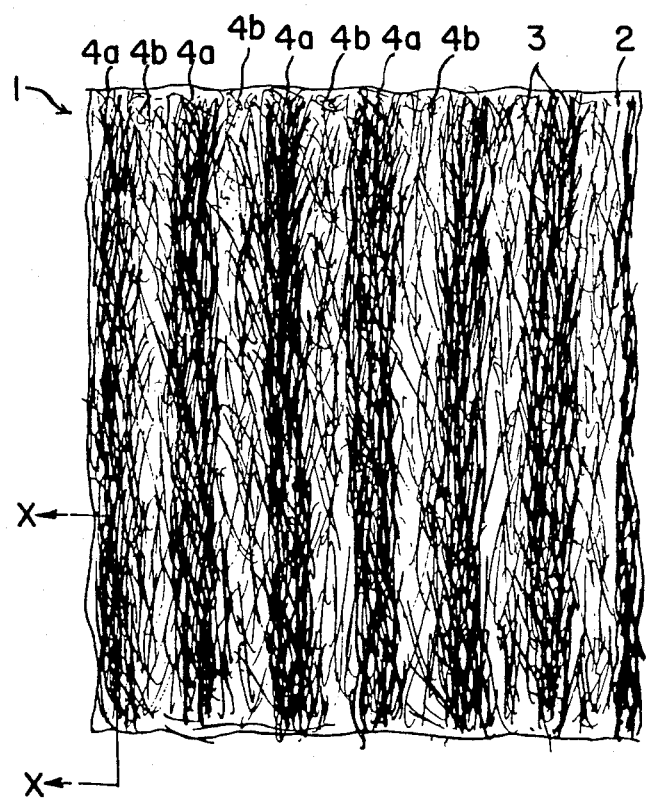
FIG. 1 is a fragmentary top view schematically showing the nonwoven fabric according to the present invention.
Figure 2:
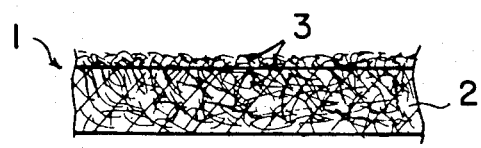
FIG. 2 and FIG. 3 are schematic sections taken along a line X—X in FIG. 1.
Figure 3:
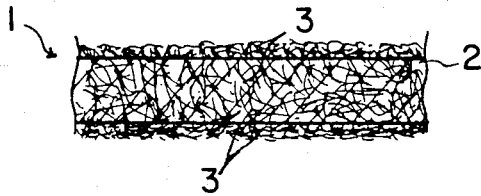

Referring to FIGS. 1, 2 and 3, nonwoven fabric 1 consists of a stretchy and elastic foamed sheet 2 and short fibres 3. The short fibres 3 are implanted from a surface of the foamed sheet 2 as deeply as into the interior thereof in the nonwoven fabric 1 as shown by FIG. 2. In the nonwoven fabric 1 as shown by FIG. 3, said short fibres 3 are implanted from a surface of the foamed sheet 2 through the latter outwardly of another surface or from opposite surfaces as deeply as into the interior of said foamed sheet 2. In any cases, the short fibres 3 are implanted on the foamed sheet 2 in a striped pattern defined by high density zones 4a and low density zones 4b alternately arranged substantially at regular intervals transversely of the nonwoven fabric 1. Such manner of implantation is characterized by that the short fibres 3 are not only mutually entangled on one surface (in the nonwoven fabric of FIG. 2) or both surfaces (in the nonwoven fabric of FIG. 3) of the foamed sheet 2 but also complicatedly interlocked with material of the foamed sheet 2 along the surface(s) and in the interior thereof.

The foamed sheet 2 may be of foamed polyurethanes such as those obtained from reactions as between saturated polyester and isocyanate, polyether and isocyanate, and castor oil and isocyanate, or of foamed celluloses, and in any cases must have open pores. The foamed sheet of closed pore type would make interlocking of the short fibres with material of the foamed sheet and, therefore, implantation thereof on the foamed sheet difficult. Furthermore, such foamed sheet of closed pore type would make it impossible to give air-permeability and water absorptivity to the nonwoven fabric of the present invention, when these properties are desired.

The short fibres 3 may be those of a fibre length shorter than 100 mm. The fibres of a fibre length longer than 100 mm would result in fewer fibre ends and mutual entanglement of the fibres too poor to prevent said fibres from falling off the foamed sheet during handling of the nonwoven fabric 1, so far as such fibres are used in the same weight as those of the length shorter than 100 mm. No particular lower limit is imposed upon the fibre length, but use of the fibres uniformly shorter than 5 mm would result in the mutual entanglement of the fibres insufficient to hold them against falling off the foamed sheet, even though implantation thereof on the foamed sheet 1 might be facilitated. Accordingly, the fibres shorter than 5 mm may be effectively used only in combination with fibres of 30 to 50 mm or longer. As material for the short fibres 3, natural fibres such as silk, cotton and flax, regenerated fibres such as rayon and cupro-ammonium rayon, semisynthetic fibres such as acetate and premix, and synthetic fibres such as nylon, vinylon, vinylidene, vinyl chloride, polyester, acryl, polyethylene, polypropylene, polyurethane, benzoate and polyclar may be used independently or in combination. Although no particular limitation is imposed upon the fineness of these short fibres, it is preferred to use the short fibres of a denier as fine as possible.

Figure 5:
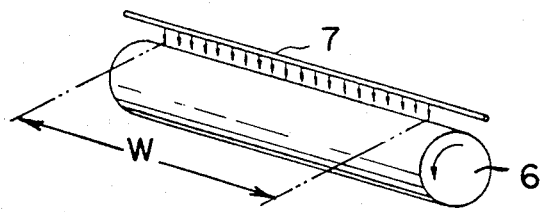
FIG. 5 is a perspective view showing one of rolls serving as supports only one of which is shown in FIG. 3 and nozzle means associated with this one of rolls.
Figure 6:
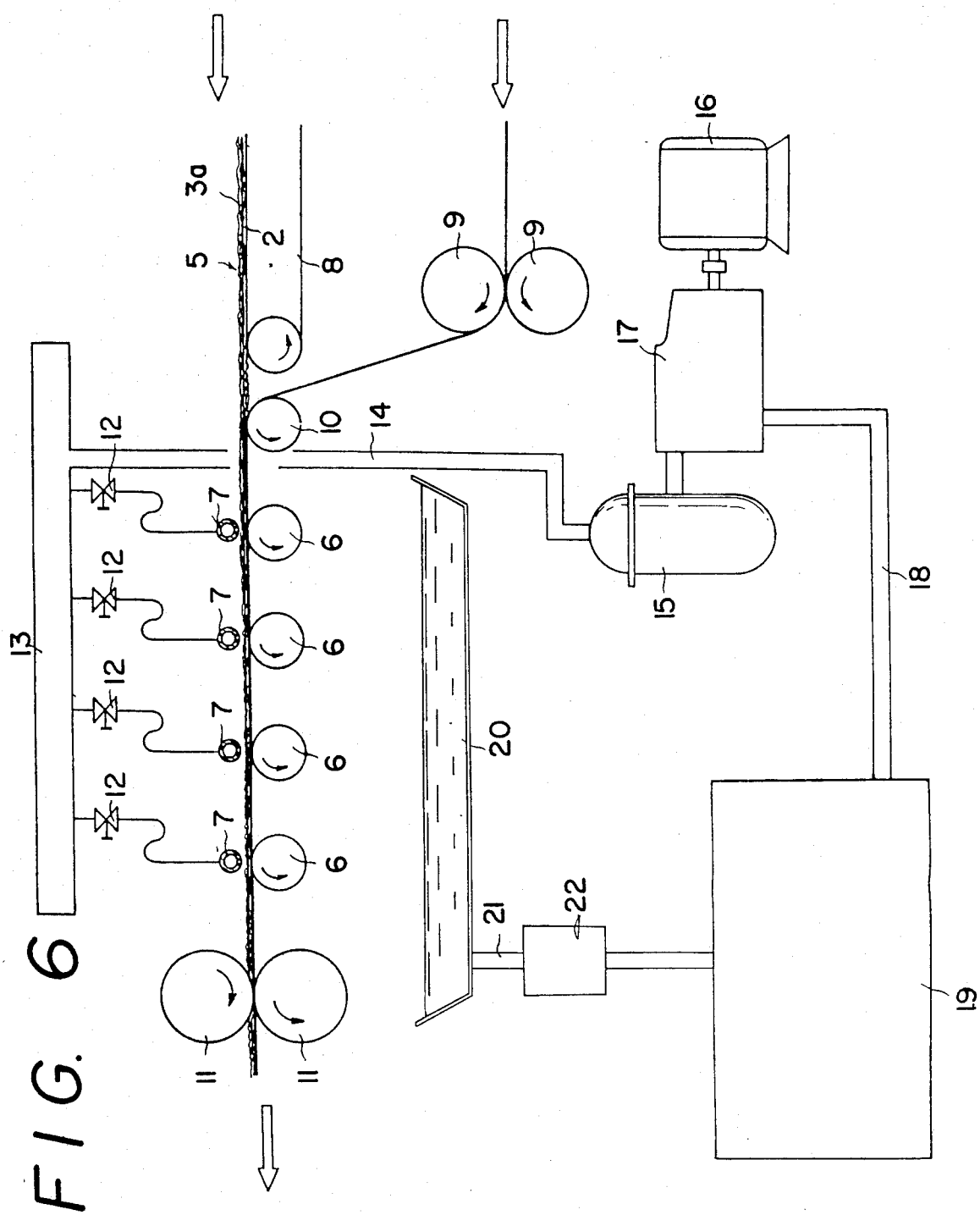
FIG. 6 is a schematic side view illustrating an apparatus for execution of the method according to the present invention.
Figure 7A:
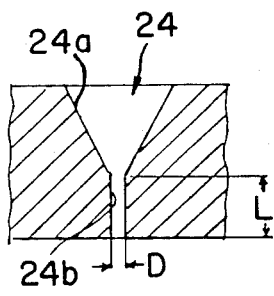
FIG. 7A–7D consists of vertical sections showing embodiments of an orifice to be formed in the bottom of said nozzle means.
Figure 7B:
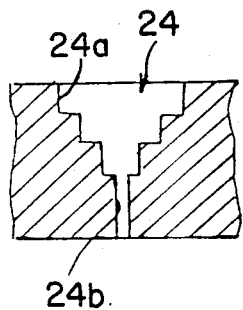
Figure 7C:
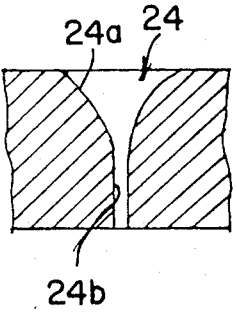
Figure 7D:
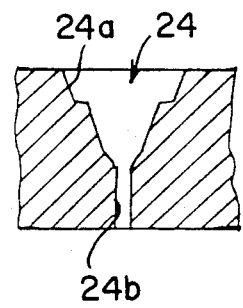

FIG. 6 illustrates by way of example an apparatus for execution of the method according to the present invention. There are provided a plurality of rolls 6 serving as water impermeable supports at given intervals along the path of initial material to be treated (starting material) 5 and there are arranged nozzle means 7 above the respective supports 6 (FIG. 5). Each of said nozzle means 7 comprises a length of pipe provided along its bottom wall with orifices each of 0.05 to 0.2 mm in diameter arranged at a pitch of 0.5 to 10 mm longitudinally of said pipe so that these orifices are opposed to the top surface of the associated support. There are provided a belt conveyor 8, a pair of feed rolls 9 and a guide roll 10 at one side of the supports 6, and a pair of tension rolls 11 having a circumferential velocity higher than that of said feed rolls 9 at the other side of the supports 6, respectively. Each of the nozzle means 7 connected is via its associated pressure regulating valve 12 to a distribution reservoir 13, which is, in turn, connected by a pipe 14 to a filter reservoir 15. The filter reservoir 15 is connected to a pressure pump 17 adapted to be driven by a motor 16. Said pressure pump 17 is connected by a pipe 18 to a reservoir 19. In a space extending under the supports 6 and the tension rolls 11, there is provided a tray-like recovery reservoir 20 which is connected via a pipe 21. A quantity of water in the reservoir 19 and a filter box 22 to said reservoir 19 is pressurized by the pressure pump 17, filtered by the filter reservoir 15, then distributed from the distribution reservoir 13 to the nozzle means 7 and then jetted through the orifices formed in the nozzle means 7 onto the supports 6.

The initial material 5 to be treated consists of the elastic and stretchable foamed sheet 2 introduced from the feed rolls 9 via the guide roll 10 onto the supports 6 and a web 3a of short fibres guided by the belt conveyor 8 so as to be laid upon said foamed sheet 2, and then, with said foamed sheet 2 being longitudinally stretched between said two pairs of rolls 9 and 11, is subjected to high energy treatment with columnar water jet streams supplied from the nozzle means 7 through the orifices formed therein. The water jet streams which have completed their action upon the initial material 5 and lost their energy are drained into the recovery reservoir 20, filtered by the filter box 22 and then recycled to the reservoir 19.

Figure 4:
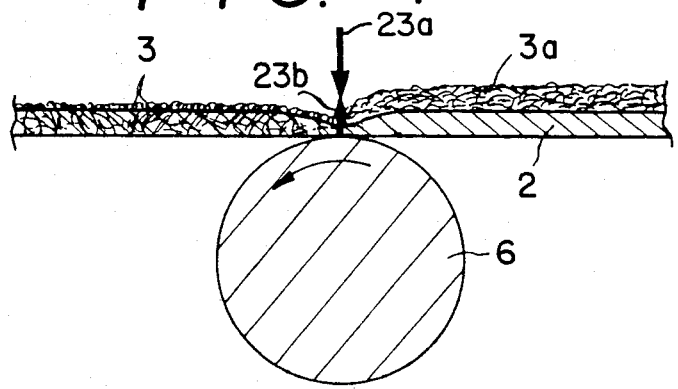
FIG. 4 is a schematic section taken in the direction of the thickness of the initial material to be treated to illustrate a principle on which the water jet streams act upon said initial material in the method according to the present invention.

FIG. 4 illustrates a principle on which the water jet streams act upon said initial material. The water jet streams 23a act on the initial material not only as these water ket streams penetrate the short fibre web 3a and the foamed sheet 2 but also as they rebound on the supports 6 and then penetrate said two components again. Thus, the foamed sheet 2 and the short fibre web 3a are treated under interaction of the water jet streams 23a and the rebound streams thereof. In consequence, the short fibres 3 in the web 3a are three-dimensionally moved and effectively implanted on the foamed sheet 2 in the manner as already mentioned in connection with FIGS. 1, 2 and 3.

To enable such treatment to be achieved at a high efficiency, at least the following requirements (A), (B), (C) and (D) must be satisfied.

(A) The foamed sheet 2 should be of so-called open pore type and of a thickness less than 5 mm;

(B) The water jet streams should be supplied at a pressure higher than 15 kg/cm$^2$ and preferably than 25 kg/cm$^2$;

(C) The supports 5 should have their surface layers adequately hard, e.g., higher than 50°, preferably than 70° in accordance with JIS (Japanese Industrial Standard)-K6301Hs; and (D) During treatment of the initial material 5 with the water jet streams, the foamed sheet 2 should be maintained longitudinally or transversely stretched by 10% or more.

When these requirements are not completely met, it would be difficult to obtain effective mutual entanglement of the short fibres 3 in the web 3a, interlocking of said short fibres with material of the foamed sheet 2 and therefore reliable implantation of said short fibres on said foamed sheet 2, even if the initial material 5 is treated for a long period with the water jet streams or the orifices through which said water jet streams are supplied are arranged on a level as close to said initial material as possible, mainly because the foamed sheet 2 has an intrinsic cushion effect under which the energy of the water jet streams to act upon the short fibre web 3a would be absorbed by said foamed sheet. Further, a load of the amount of water which has completed its action upon the initial material and lost its energy would generate waves or wrinkles in said initial material along the extent to be treated and make the treatment difficult, unless the foamed sheet 2 is not being stretched by 10% or more. With the foamed sheet 2 being under a sufficient tensile stress to achieve said stretching, on the contrary, the cushion effect of the foamed sheet 2 is reduced, i.e., the thickness of said foamed sheet 2 is reduced and cells thereof are stretched to facilitate mutual entanglement of the short fibres 3, interlocking of said short fibres with material of the foamed sheet and implantation of said short fibres on said foamed sheet. As previously described, the present invention is based on the intention of obtaining elasticity in both directions of thickness and extent (i.e., cushion characteristic and stretchiness). Such elasticity is obtained only when the treatment for fibre implantation is carried out with the foamed sheet 2 being longitudinally or transversely stretched.

It should be noted here that the elasticity of the nonwoven fabric 1 in both directions generally depends on the elasticity of the foamed sheet 2 but the elasticity region thereof is governed by a strength with which the short fibres are interlocked with material of the foamed sheet 2 in the surface and the interior of said foamed sheet 2 as expressed by the following formula;

$$a = b + c - \Delta d$$

where
a: elasticity region of the nonwoven fabric 1
b: elasticity of the foamed sheet 2
c: stretch of short fibres 3 interlocked with material of the foamed sheet 2 in the surface and the interior thereof
$\Delta d$: entangling strength of the short fibres 3 (depending on basic weight of fibres as well as on material of the foamed sheet).
$b \approx 0$ when the foamed sheet is being stretched only in longitudinal direction but not in transverse direction.

To place the foamed sheet 2 under a tensile stress exerted in its longitudinal direction, said foamed sheet is longitudinally stretched between the pairs of rolls 9, 11, as already described in reference with FIG. 3. To place said foamed sheet 2 under a tensile stress exerted in its transverse direction, said foamed sheet may be stretched by means of well known art such as a pin tenter and a clip tenter.

The supports 6 preferably comprise rolls of 50 to 300 mm in diameter for adequate resistance to the high pressure of the water jet streams and for efficient drainage on said supports. These rolls may be made of metal, rubber or plastics, or of multi-layered construction comprising a combination of these materials, so far as said rolls are provided with adequately hard surfaces.

The short fibre web 3a may be a sheet-like web obtained from the carding process or the paper making process, so far as such web permits the short fibres 3 of said web to be easily moved into the interior of the foamed sheet 2. Such short fibre web 3a is preferably of a basic weight between 5 and 80 g/m². The short fibre web of a basic weight less than 5 g/m² can not be advantageously used as the web for the present invention, since such basic weight should result in a web in which the short fibres are unevenly distributed. With the web of a basic weight more than 80 g/m², on the contrary, the quantity of fibres relative to the foamed sheet 2 would be so excessive that the cells of said foamed sheet are easily broken and, in addition, the layer of fibres to be implanted on said foamed sheet would be so thick that the energy of the water jet streams is substantially absorbed by said layer of fibres during the hydraulic energy treatment and the efficiency of this treatment is remarkably reduced.

Preferably, the water jet streams are columnar streams supplied from the orifices of 0.05 to 0.2 mm in diameter arranged at a pitch of 0.5 to 10 mm vertically onto the top surfaces of the associated supports 6. Several examples of the nozzle means provided with such orifices are shown by FIGS. 7A-7D. As shown, each of the orifices 24 comprises, in its vertical section, a downward tapered portion 24a and a linear portion 24b wherein L/D, a ratio of the length L of said linear portion 24b to the diameter D of the same portion 24b is preferably selected less than 4/1, more preferably less than 3/1 to keep a loss of the jet pressure due to a flow resistance within the orifice 24 at a negligible level. If the orifice 24 is selected to have a cylindrical shape defined by one and same diameter and to have said ratio L/D of 4/1 or higher, the pressure loss due to the flow resistance within the orifice 24 would increase to a level which is economically disadvantageous. Moreover, a transverse average flow rate of the water streams to be jetted through such orifices 24 is preferably less than 40 cc/sec.cm, more preferably less than 30 cc/sec.cm. The term "transverse average flow rate" means a value F/W where F represents a total flow jetted onto each of the supports 6 and W represents an effective width of the nozzle means arranged above this support. When this transverse average flow rate excesses 40 cc/sec.cm, the initial material 5 to be treated would be flooded due to poor drainage and the short fibres would float in such flooding water. As a result, the water jet streams would act on these short fibres with the energy so reduced that the desired efficient treatment of said initial material should be disadvantageously prevented.

The nonwoven fabric of the present invention thus obtained from the treatment as mentioned above may be already utilized for many purposes without any further treatments, but may be subjected to a water repellent treatment when it is desired to use this nonwoven fabric as material for products requiring the water repellent property and the water pressure resistance. The water repellent treatment is achieved by immersing the nonwoven fabric into water repellent solution or by spraying such solution onto the nonwoven fabric after completion of the treatment with the water jet streams. Said water repellent solution may be added to the water jet streams so that during the energy treatment of the initial material 5 with the hydraulic energy of said water jet streams said initial material may be subjected simultaneously to the water repellent treatment also. The nonwoven fabric or the initial material thus immersed with an adequate quantity of water repellent solution in this treatment may have a content of said repellent solution controlled as under suction and then be dried. The water repellent agents which can be effectively used for this purpose include those of well known art, for example, the water repellent agent of silicon type (dimethylpolysiloxane, hydropolysiloxane, epoxypolysiloxane, aminopolysiloxane, carboxypolysiloxane), the water repellent agent of wax type, the water repellent agent of metallic soap type, and the water repellent agent of fluorine type, which may be used in combination with resins such as the resins of condensation type (glyoxal) and the resins of high molecular fixation type (acrylic ester, polyvinyl acetate), if desired, to provide the initial material with partial texture filling and to improve its water pressure resistance. The nonwoven fabric is bestowed by such treatment with water repelling ability and water pressure resistance which are approximately three times higher than those of the foamed sheet (polyurethane) and approximately 1.5 times higher than those of the short fibre web alone. Such improvement is due to the fact that the pore density in the foamed sheet has been improved by the short fibres implanted or embedded into these pores.

EXAMPLE 1

The present Example indicated that it is essential for execution of the present invention to introduce the fibrous web onto the foamed sheet of open pore type which is maintained in a stretched condition so as to achieve the optimal implantation of the short fibres on said foamed sheet.

As the initial material to be treated, an assembly comprising a parallel web of rayon 1.5 d×51 mm.30 g/m² which had been obtained from the roller card and a foamed urethane sheet of polyester type which is 1.5 mm thick and on which said parallel web is layered. Such initial material to be treated was treated in the apparatus as shown by FIG. 6, in which said foamed sheet was squeezed by the respective pairs of rolls 9, 11 and thereby stretched at various velocity ratios of these pairs of rolls 9, 11, i.e., 108%, 120%, 150% and 190%, and thereafter said fibrous web was introduced onto said sheet. The initial material thus assembled was then subjected to high energy treatment with the water jet streams supplied at a pressure of 32 kg/cm² from the respective nozzle means 7 arranged between said pairs of rolls 9, 11, through the orifices of 0.13 mm in diameter arranged at a pitch of 1 mm longitudinally of said respective nozzle means 7.

At the velocity ratio between the pairs of rolls 9, 11 or the stretch of said foamed sheet being 108%, said foamed sheet hung down at the zones defined by the respectively adjacent two nozzle means 7 due to poor drainage of the water jet streams supplied from the respective nozzle means 7 and, as a result, not only said fibrous web fell into disorder but also said foamed sheet inconveniently undulated, making the desired treatment impossible.

At the other velocity ratios of 120%, 150% and 190%, the treatment was certainly possible but after said foamed sheet was relieved from the tensile stress which had been imposed thereupon, said foamed sheet shrinked and said fibrous web layered thereupon became crapy.

Superficial profile of the nonwoven fabric thus obtained presented a striped pattern corresponding to the pitch at which the orifices were arranged.

EXAMPLE 2

The present Example indicates that the condition of the starting material is important to obtain the desired product.

As the starting material, the assemblies comprising a sheet of foamed urethane of polyethylene type and parallel webs of polyester of 1.4 d×51 mm which are respectively of 20 g/m², 40 g/m² and 70 g/m² in basic weight were used. The treatment was conducted in the apparatus as mentioned in Example 1, in which the velocity ratio of the pairs of rolls 9, 11 was adjusted to 130%.

TABLE

| No. | Thickness of urethane (mm) | Basic weight of web (g/m²) | Remarks |
|---|---|---|---|
| 1 | 0.6 | 20 | |
| 2 | 1.2 | 20 | |
| 3 | 2.0 | 20 | |
| 4 | 5.0 | 20 | Web is not embedded in urethane |
| 5* | 1.2 | 40 | |
| 6 | 1.2 | 40 | |
| 7 | 1.2 | 80 | |
| 8* | 1.2 | 70 | Web is not embedded in urethane |

Mark * in the above Table indicates that the corresponding sample was obtained by laying the fibrous web on the urethane sheet, treating this assembly, then turning over and laying another fibrous web on the rear side of said sheet and treating the assembly again (FIG. 3).

Mark * in the above Table indicates that the corresponding sample was obtained by laying the fibrous web on the urethane sheet, treating this assembly, then turning over and laying another fibrous web on the rear side of said sheet and treating the assembly again (FIG. 3).

What is claimed is:

1. Fibre-implanted nonwoven fabric comprising a stretchably elastic foamed sheet of open pore type having a thickness less than 5 mm and short fibres of which the fibre length is shorter than 100 mm and the basic weight is between 5 and 80 g/m², wherein said short fibres are implanted from at least one surface of said foamed sheet deeply into the interior thereof in a striped pattern defined by alternately arranged zones of high density and low density and wherein said short fibres are not only mutually entangled on said surface but also are interlocked with material of said foamed sheet on said surface as well as in the interior of said foamed sheet.

2. Fibre-implanted nonwoven fabric according to claim 1, wherein the foamed sheet is selected from those of polyurethane type and of cellulose type.

3. Fibre-implanted nonwoven fabric according to claim 1, wherein, as the short fibres, natural fibres, regenerated fibres, semi-synthetic fibres or synthetic fibres are used independently or in the form of a mixture thereof.

4. Fibre-implanted nonwoven fabric according to claim 1, wherein the surface and the interior of the nonwoven fabric are subjected to water repellent treatment.

5. Fibre-implanted nonwoven fabric according to claim 2 wherein as the short fibres, natural fibres, regenerated fibres, semi-synthetic fibres or synthetic fibres are used independently or in the form of a mixture thereof.

6. Fibre-implanted nonwoven fabric according to claim 2 wherein the surface and the interior of the nonwoven fabric are subjected to water repellent treatment.

7. Fibre-implanted nonwoven fabric according to claim 3 wherein the surface and the interior of the nonwoven fabric are subjected to water repellent treatment.

* * * * *